(12) United States Patent
Pfluger

(10) Patent No.: US 12,181,331 B2
(45) Date of Patent: Dec. 31, 2024

(54) TRANSDUCER ASSEMBLY FOR MOUNTING IN A ROADWAY

(71) Applicant: KISTLER HOLDING AG, Winterthur (CH)

(72) Inventor: Kim Pfluger, Winterthur (CH)

(73) Assignee: Kistler Holding AG, Winterthur (CH)

( * ) Notice: Subject to any disclaimer, the term of this patent is extended or adjusted under 35 U.S.C. 154(b) by 484 days.

(21) Appl. No.: 17/607,575

(22) PCT Filed: Apr. 29, 2020

(86) PCT No.: PCT/EP2020/061871
§ 371 (c)(1),
(2) Date: Oct. 29, 2021

(87) PCT Pub. No.: WO2020/225051
PCT Pub. Date: Nov. 12, 2020

(65) Prior Publication Data
US 2022/0221326 A1 Jul. 14, 2022

(30) Foreign Application Priority Data
May 7, 2019 (EP) ..................................... 19172915

(51) Int. Cl.
*G01G 19/02* (2006.01)
*G01G 3/13* (2006.01)

(52) U.S. Cl.
CPC ............. *G01G 19/024* (2013.01); *G01G 3/13* (2013.01)

(58) Field of Classification Search
CPC ................................ G01G 19/024; G01G 3/13
See application file for complete search history.

(56) References Cited

U.S. PATENT DOCUMENTS 4,799,381 A * 1/1989 Tromp ...................... G01L 1/20
73/146
5,461,924 A * 10/1995 Calderara ................ G01G 3/13
73/768

(Continued)

FOREIGN PATENT DOCUMENTS

EP 0 654 654 A1 5/1995
RU 2554678 C1 6/2015
(Continued)

OTHER PUBLICATIONS

PCT Search Report and Written Opinion, Jun. 26, 2020, 11 pages.
(Continued)

*Primary Examiner* — Natalie Huls
(74) *Attorney, Agent, or Firm* — Dority & Manning, P.A.

(57) ABSTRACT

A transducer assembly for mounting in a roadway includes a hollow profile defining sides extending along a longitudinal axis, an insulating element arranged on the exterior of the sides of the hollow profile. The profile defines an interior facing away from the exterior of the sides and defining a cavity. A force sensor assembly is disposed within the cavity of the hollow profile. The insulating element is secured to the hollow profile by a positive fit connection and is configured to insulate the transducer assembly from a rolling force acting on the sides of the hollow profile. When the transducer assembly is installed in a roadway, the force sensor assembly is configured to detect a weight force exerted onto the hollow profile.

13 Claims, 6 Drawing Sheets

(56) References Cited

U.S. PATENT DOCUMENTS

| | | | | |
|---|---|---|---|---|
| 5,501,111 | A | * | 3/1996 | Sonderegger ........ G01G 19/024 29/25.35 |
| 5,942,681 | A | * | 8/1999 | Vollenweider ........ G01L 17/005 73/146 |
| 9,372,110 | B2 | * | 6/2016 | Cornu .................... G01G 21/28 |
| 10,048,110 | B2 | | 8/2018 | Demozzi et al. |
| 2018/0031429 | A1 | | 2/2018 | Pfluger |
| 2020/0096382 | A1 | * | 3/2020 | Pfluger .................... G01L 1/16 |

FOREIGN PATENT DOCUMENTS

| WO | WO 2013/017768 A1 | 2/2013 |
|---|---|---|
| WO | WO 2015/104265 A1 | 7/2015 |
| WO | WO 2018/114821 A1 | 6/2018 |

OTHER PUBLICATIONS

Foreign Office Action with English translation for JP application No. 2021-565916, Oct. 19, 2022, 9 pages.
Foreign Search Report with English translation for RU application 2021135719/28(75337), Nov. 8, 2022, 4 pages.

* cited by examiner

TRANSDUCER ASSEMBLY FOR MOUNTING IN A ROADWAY

CROSS REFERENCE TO RELATED APPLICATIONS

The present application claims priority to International Application Serial No. PCT/EP2020/061871, which is hereby incorporated herein in its entirety by this reference for all purposes.

FIELD OF THE INVENTION

The present invention relates to a transducer assembly for mounting in a roadway that, after mounting, detects a weight force exerted onto the roadway according to the preamble of the independent claim.

BACKGROUND OF THE INVENTION

While traveling on a lane of a roadway, vehicles exert a weight force onto the roadway. Weight force is intended to mean the force a vehicle exerts onto the roadway in the direction of the gravitational field of the earth. Generally, the weight force is exerted onto the roadway by a wheel of the vehicle. The following description relates to a roadway surface that extends in a direction perpendicular to the gravitational field of the earth. However, the description is readily applicable to a roadway that is inclined with respect to the gravitational field of the earth.

Monitoring of the number, wheel load, axle load, total weight and tire pressure of the traveling vehicles is frequently performed to avoid damage to the roadway and to increase safety. For this purpose, a transducer assembly is inserted in the roadway that detects the weight force of each vehicle passing over the transducer assembly. Reliable detection of the weight force even of a vehicle that crosses the transducer assembly at normal traveling speed is ensured by using a force sensor assembly disposed in the transducer assembly.

Such a transducer assembly for mounting in a roadway is disclosed in EP0654654B1, which corresponds to applicant's commonly owned U.S. Pat. No. 5,461,924 and which is hereby incorporated herein in its entirety by this reference for all purposes. The transducer assembly is mounted in a groove in the roadway and is cast with a casting compound. The transducer assembly has the shape of a hollow profile extending along a longitudinal axis. In a cavity of the hollow profile formed by a tube-shaped portion of the hollow profile is arranged a force sensor assembly that is in mechanical contact with the hollow profile. A plate-shaped force introduction element transmits a force that acts on the hollow profile to the force sensor assembly. Furthermore, the prior art transducer assembly according to EP0654654B1 comprises two insulating elements arranged laterally next to a tubular portion. These insulating elements reduce a force shunt. Thus, the force acting on the transducer assembly is not only transmitted through the force sensor assembly but to some extent also through the wall of the tubular portion and the insulating elements arranged next to the tubular portion. The material of the insulating elements has a lower modulus of elasticity than the surrounding casting compound and, therefore, reduces the force shunt as compared to a tubular portion directly enclosed by casting compound. In addition, the insulating elements reduce an interference due to forces that act onto the sides the hollow profile. Such forces are also known as rolling forces and are induced by a force a vehicle exerts onto the roadway which results in a deflection of the roadway. This deflection of the roadway induces a rolling force that precedes and follows the vehicle within the roadway. A rolling force that acts onto the sides of the hollow profile would falsify the measurement of the weight force by the force sensor assembly.

A force sensor assembly is an arrangement of at least one force sensor along the longitudinal axis of the hollow profile. A force sensor assembly is configured to detect a force acting onto the force introduction element at any point along the longitudinal axis of the transducer assembly.

For easier mounting of the transducer assembly in the roadway, the insulating elements are generally adhesively bonded to the hollow profile to avoid sliding of the insulating elements relative to the hollow profile. A disadvantage is that the adhesive needs a long time for drying which makes the production of the transducer assembly more expensive. In addition, an adhesive that is not applied evenly over the length of the hollow profile may have a negative impact on the force shunt since the adhesive represents a localized stiffening. This reduces the measurement accuracy of the transducer assembly.

When no adhesive is used, the insulating elements must be held in place by a temporary structure to prevent sliding while the transducer assembly is mounted in the roadway. In this case, the last part of the groove can only be filled with casting compound after a first portion of the casting compound is hardened and gets solid to an extent that the temporary structure may be removed and the insulating elements are secured by the first amount of casting compound. This makes mounting complex and increases the time during which the roadway must be closed for vehicles due to the mounting process.

EXEMPLARY OBJECTS AND SUMMARY OF THE INVENTION

It is an object of the present invention to secure the insulating elements to the hollow profile of the transducer assembly more quickly and at lower cost thereby reducing production costs and simplifying the mounting of the transducer in the roadway.

It is a further object of the present invention to improve the measurement accuracy of the transducer assembly.

At least one of these objects has been achieved by the features described hereinafter.

The invention relates to a transducer assembly for mounting in a roadway; which transducer assembly comprises a hollow profile extending along a longitudinal axis, a force sensor assembly and at least one insulating element arranged on the outside of the hollow profile; which insulating element insulates the transducer assembly in the mounted state from a rolling force that acts on the sides thereof; wherein said hollow profile comprises a cavity and said force sensor assembly is arranged in said cavity; wherein after mounting of the transducer assembly the force sensor assembly is configured to detect a weight force exerted onto the hollow profile; wherein the insulating element and the hollow profile are connected to one another by positive fit connection.

Each of the opposite sides of the hollow profile defines an elongated channel that is configured to receive therein an insulating element in a secure fashion. The complementary configurations of the channel and the insulating element permit a sliding insertion of the insulating element during production of the transducer assembly. The configuration of the channel and the resilient deformability of the insulating element also combine to permit the insulating element to be press fit into the channel during production of the transducer assembly. Moreover, this alternative production technique is achieved without adversely affecting the ability of the insulating element composition to minimize any undesired force shunt.

The positive fit connection between the insulating element and the hollow profile has the advantage that the insulating element is firmly secured relative to the hollow profile during mounting of the transducer assembly in the roadway. Thus, no adhesive is required for securing the insulating element with respect to the hollow profile during mounting of the transducer assembly in the roadway. Furthermore, no temporary structures are required for securing the insulating element relative to the hollow profile during mounting of the transducer assembly in the roadway.

BRIEF DESCRIPTION OF THE DRAWINGS

In the following, the invention will be explained in more detail by way of example referring to the figures in which.

DETAILED DESCRIPTION OF EXEMPLARY EMBODIMENTS OF THE INVENTION

Figure 1:
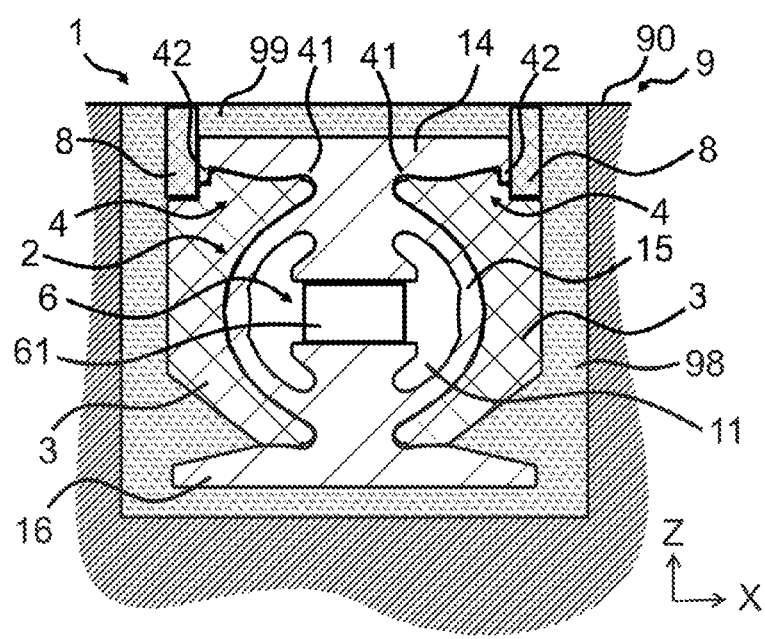
FIG. 1 shows a cross-sectional view in the X-Z plane of a roadway with an embodiment of the transducer assembly arranged in the roadway.

FIG. 1 shows in cross-section through the X-Z plane, a schematic partial view of a roadway 9 with an embodiment of the transducer assembly 1 arranged in the roadway 9. The transducer assembly 1 is shown in sectional view cut in a direction perpendicular to the longitudinal axis Y. In the embodiment shown, the hollow profile is generally indicated by the arrow from the number 2 and comprises a plate-shaped force introduction element 14 and a plate-shaped anchoring element 16. The two larger dimensions of the force introduction element 14 and the anchoring element 16 extend along the longitudinal axis Y and along a transverse axis X. The thickness direction of the force introduction element 14 and the anchoring element 16 extends along a vertical axis Z, which vertical axis Z is perpendicular to the direction of the two larger dimensions of the plates that define the respective elements 14, 16. Each of the two opposite sides of the hollow profile 2 also extends in the direction of the longitudinal axis y.

The longitudinal axis Y, transverse axis X and vertical axis Z form an orthogonal system. When the transducer assembly 1 is mounted in the roadway 9, the vertical axis Z is substantially perpendicular to the roadway surface 90 while the transverse axis X and longitudinal axis Y are substantially parallel to the roadway surface 90. At least one insulating element 3 is arranged at the hollow profile 2 at a lateral position with respect to the transverse axis X.

Generally, as schematically shown in FIG. 1 for example, the transducer assembly 1 is embedded in the roadway 9 by using a casting compound 98 that surrounds the transducer assembly 1 beneath its lower side with respect to the vertical axis Z and laterally with respect to the transverse axis X. Typically, a decoupling strip 8 is arranged on each of the opposite sides of the force introduction element 14 with respect to the transverse axis X. Each strip 8 extends over the length of the insulating element 3 along the longitudinal axis Y and extends in the vertical direction Z from the insulating element 3, touching the force introduction element 14 laterally, up to the roadway surface 90. Typically, the force introduction element 14 is provided with an upper casting compound 99 above its upper surface with respect to the vertical axis Z. The upper casting compound 99 and the embedding casting compound 98 are separated and mechanically decoupled from one another by means of the decoupling strip 8.

Advantageously, a decoupling strip 8 will be made of rubber, natural rubber, expanded polyethylene, expanded polystyrene, extruded polystyrene, expanded ethylene-propylene-diene rubber, expanded silicone, or expanded polypropylene.

The transducer assembly 1 desirably has a dimension of between 500 mm and 5000 mm along the longitudinal axis Y; and the dimension of the transducer assembly 1 along the transverse axis X is desirably between 20 mm and 100 mm; and the dimension of the transducer assembly 1 along the vertical axis Z is desirably between 20 mm and 150 mm.

Figure 5:
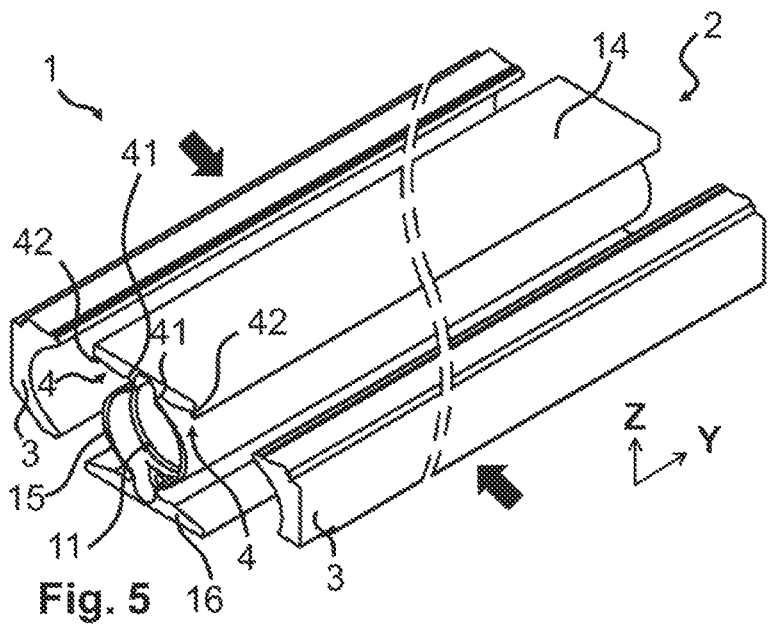
FIG. 5 shows a partial perspective view of disassembled components of an embodiment of the transducer assembly.

In a presently preferred embodiment of the transducer assembly 1 schematically shown in FIG. 5 for example, the hollow profile 2 comprises a tubular portion 15, which tubular portion 15 is arranged between the force introduction element 14 and the anchoring element 16. The tubular portion 15 encloses the cavity 11 defined in the interior of the hollow profile 2. The anchoring element 16 and the tubular portion 15 and the force introduction element 14 desirably are made in one piece. The tubular portion 15 accordingly is integrally connected to the force introduction element 14 and to the anchoring element 16.

Figure 2:
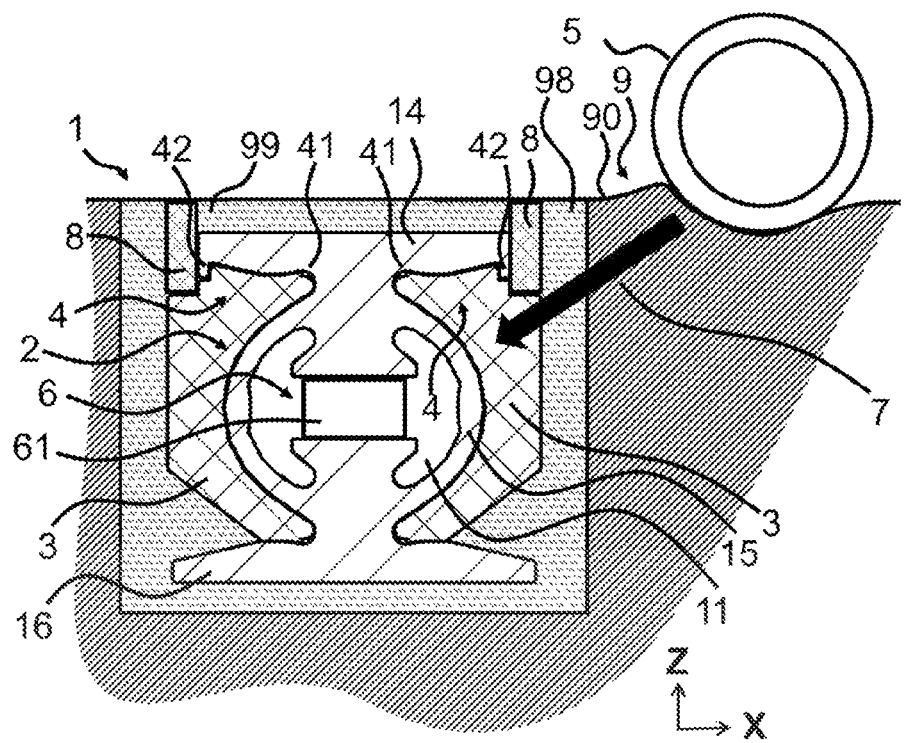
FIG. 2 shows a cross-sectional view in the X-Z plane according to FIG. 1 and additionally showing a schematic representation of an approaching vehicle's wheel.
Figure 3:
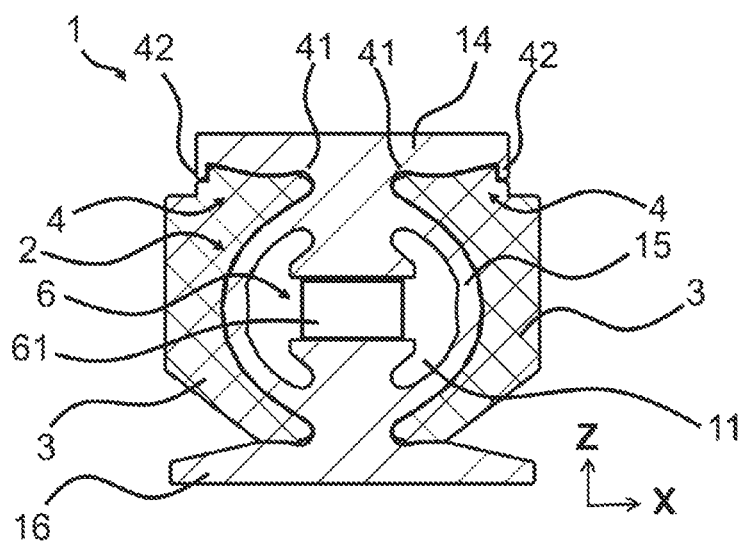
FIG. 3 shows a cross-sectional view in the X-Z plane of an embodiment of the transducer assembly.

The force sensor assembly 6 is arranged within the cavity 11 of the hollow profile 2 in mechanical contact with the hollow profile 2 as schematically shown in FIGS. 1-3 for example. A force acting onto the plate-shaped force introduction element 14 of the hollow profile 2 is transmitted mainly over the force sensor assembly 6. Thus, the force sensor assembly 6 is arranged in the main direction of force flow in which the force acting onto the hollow profile 2 from the roadway surface 90 is mainly transmitted. From the force sensor assembly 6, the force from the roadway surface 90 is transmitted over the anchoring element 16 into the underground. A tubular portion 15 of the hollow profile 2 and the insulating elements 3 transmit a portion of the force from the roadway surface 90 over the anchoring element 16 into the underground. The tubular portion 15 and the insulating elements 3 form a force shunt.

A force sensor assembly 6 is, for example, a force-sensitive optical fiber extending along the longitudinal axis Y, or a piezoresistive element extending along the longitudinal axis Y, or a strain gauge extending along the longitudinal axis Y, or a number of discrete and spaced-apart force sensors, such as piezoelectric force sensors, piezoresistive force sensors, strain gauges, capacitive force sensors, or other sensors configured for determining a force.

In a presently preferred embodiment, the force sensor assembly 6 is accommodated in the hollow profile 2 under a preload force that is exerted onto the force sensor assembly 6 by the walls of the tubular portion 15. This is advantageous because it establishes a well-defined mechanical contact between the hollow profile 2 and the force sensor assembly 6.

FIG. 2 shows the transducer assembly 1 of FIG. 1 and the effect of a rolling force 7 is illustrated schematically by the lateral black arrow in FIG. 2. A rolling force 7 that acts on the sides of the hollow profile 2 affects the mechanical contact between the hollow profile 2 and the force sensor assembly 6 and, therefore, interferes with a detection of the weight force acting on the transducer assembly 1. The interference of the detection of the weight force is minimized by the insulating element 3 arranged laterally at the hollow profile 2.

Figure 4:
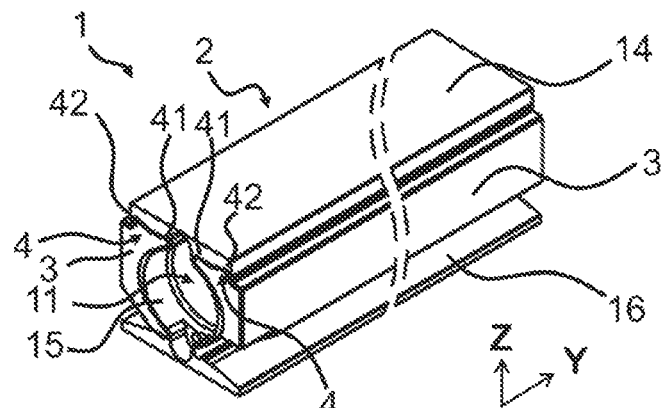
FIG. 4 shows partial perspective view of an embodiment of the transducer assembly.

FIG. 3 and FIG. 4 show the transducer assembly 1 of FIG. 1 and FIG. 2 before the transducer assembly 1 is mounted in the roadway 9. According to the invention, the insulating element 3 and the hollow profile 2 are connected to one another by a positive fit connection. The positive fit connection is configured so that despite the lack of any adhesive bonding material between them, the insulating element 3 and the hollow profile 2 do not disengage from each other absent the application of a positive force to pry them apart. This has the advantage that interfering rolling forces continue to be minimized by the insulating element 3 while the time needed for manufacturing is reduced in comparison to the insulating elements 3 according to the prior art that are adhesively bonded to the hollow profile 2.

In a preferred embodiment, the positive fit connection is configured to be effective in a direction perpendicular to the longitudinal axis Y. An effect of the positive fit connection perpendicular to the longitudinal axis Y is intended to mean that the insulating element 3 is fixed with respect to the hollow profile 2 in all directions perpendicular to the longitudinal axis Y. It is not necessary to secure the insulating element 3 in the direction of the longitudinal axis Y for mounting. When it is mounted, the transducer assembly 1 is handled with its longitudinal axis Y substantially vertical with respect to the gravitational field of the earth. This prevents the insulating element 3 from slipping out of the positive fit connection due to gravity even if the transducer assembly 1 is rotated about its longitudinal axis Y, for example during transport to the groove in the roadway 9. Thus, by fixing the insulating element 3 relative to the hollow profile 2 in all directions perpendicular to the longitudinal axis Y the insulating element 3 is secured for mounting of the transducer assembly 1 and the insulating element 3 cannot become detached from the hollow profile 2 during mounting.

In a presently preferred embodiment, the insulating element 3 is connected to the hollow profile 2 by a positive fit connection by a holding means 4. For this purpose, the hollow profile 2 comprises at least one holding means 4 that is configured for establishing a positive fit connection between the insulating element 3 and the hollow profile 2. Possible embodiments of a hollow profile 2 comprising a holding device 4 are shown in FIGS. 1 to 6 and FIGS. 8 to 9.

In the embodiment shown in FIGS. 1 to 9, the holding means 4 is u-shaped in cross-section when cut perpendicularly to the longitudinal axis Y of the hollow profile 2. The u-shape of the holding means 4 is characterized by two spaced-apart legs, which legs are connected to one another by a base at one end while the respective other ends of the legs are free. Additionally, the u-shape is such that at least a first distance between two points located on different legs is greater than a second distance between the free ends of the legs of the u-shape; wherein the first and second distances extend parallel to each other. Accordingly, in a section perpendicular to the longitudinal axis Y of the hollow profile 2, the insulating element 3 has a smaller dimension in the area between the free legs of the U-shape than between the two points located on different legs that define the first distance. As a result, a positive fit connection is established between the insulating element 3 and the hollow profile 2 in the plane perpendicular to the longitudinal axis Y.

Figure 6:
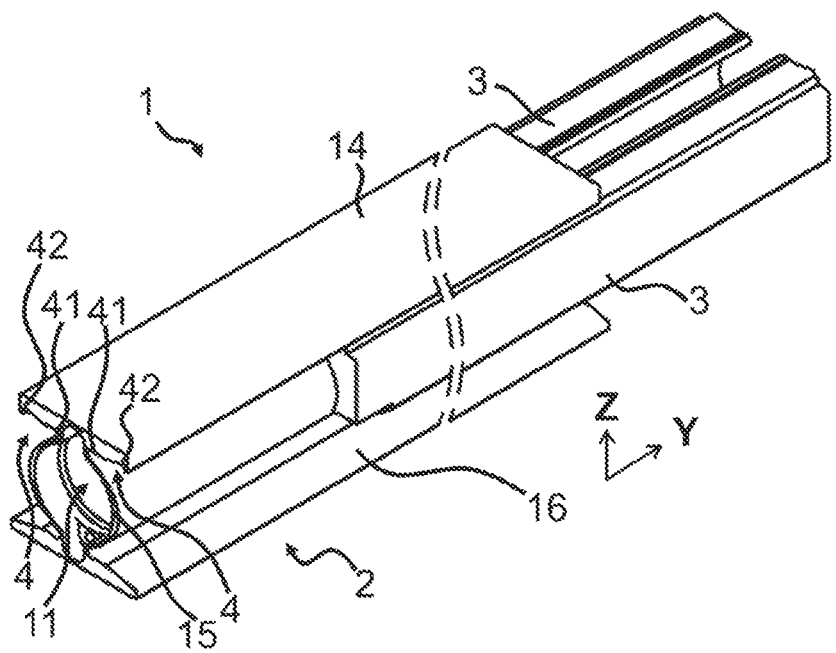
FIG. 6 shows a perspective view of an intermediate stage of assembly of an embodiment of the transducer assembly.

In one embodiment, the insulating element 3 can be inserted in the holding device 4 by moving the insulating element 3 along the longitudinal axis Y, as illustrated schematically in FIG. 6. In this way, the insulating element 3 can be quickly and easily attached to the hollow profile 2 without any need for the application of adhesive bonding material to any of the opposing surfaces that are to be connected.

In a presently preferred embodiment of the transducer assembly 1, at least two insulating elements 3 are connected to the hollow profile 2 by a positive fit connection. On each opposite side of the hollow profile 2 with respect to the transverse direction, at least one insulating element 3 is connected to the hollow profile 2 by a positive fit connection. An assembly with at least one insulating element 3 on each side of the hollow profile 2 is advantageous for minimizing rolling forces regardless of the side with respect to the transverse direction from which the rolling forces act on the transducer assembly.

Figure 7:
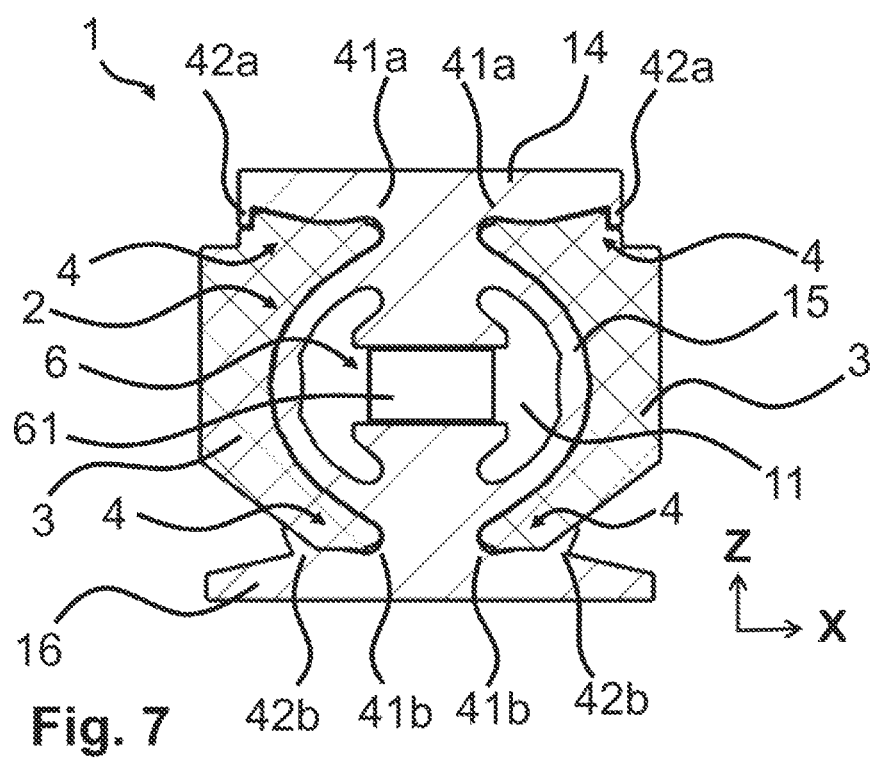
FIG. 7 shows a cross-sectional view in the X-Z plane of an embodiment of the transducer assembly.

In an embodiment of the transducer assembly 1, the holding means 4 schematically shown in FIG. 7 for example, consists of a recess 41a formed between the tubular portion 15 and the force introduction element 14 at one end of the holding means 4, and a hook-shaped retaining element 42a that depends from the underside of the force introduction element 14 and extends toward the anchoring element 16. The u-shape of the holding means 4 described above is defined by the hook-shaped retaining element 42a representing one leg of the u, by the force introduction element 14 representing the base of the u, and by the recess 41a, in which recess 41a a section of the tubular portion 15 represents the second leg of the u. The holding means 4 is accordingly configured so that the insulating element 3 thus may be secured between the recess 41a and retaining element 42a by a positive fit connection.

In an embodiment of the transducer assembly 1, the holding means 4 schematically shown in FIG. 7 can further include a recess 41b formed between the tubular portion 15 and the anchoring element 16 at one end of the holding means 4, and a hook-shaped retaining element 42b that projects from the upper side of the anchoring element 16 and extends at an angle away from the tubular portion 15 and toward the force introduction element 14. The u-shape of the enhanced holding means 4 described herein is defined by the hook-shaped retaining element 42b representing one leg of the u, by the anchoring element 16 representing the base of the u, and by the recess 41b, in which recess 41b a section of the tubular portion 15 represents the second leg of the u. The enhanced holding means 4 is accordingly configured so that the insulating element 3 thus may be secured between the recess 41b and retaining element 42b by a positive fit connection.

In another embodiment of the transducer assembly 1, the insulating element 3 is made of elastic material. Elastic material of the insulating element 3 has a modulus of elasticity that is 4 times smaller than the modulus of elasticity of the material of the hollow profile 2. When the transducer assembly 1 is in the mounted state, the insulating element 3 has a lower modulus of elasticity than the surrounding casting compound 98 so that a force shunt through the casting compound 98 is minimized.

Furthermore, it is also advantageous to keep the force shunt through the insulating element 3 as small as possible. Since the force shunt through the tubular portion 15 of the hollow profile 2 may be determined easily, a small force shunt through the insulating element 3 is advantageous for determining the portion of the force that flows through the transducer assembly 1 and, thus, for maintaining the detection accuracy of the weight force by the transducer assembly 1. In a particularly advantageous embodiment of the transducer assembly 1, the insulating element 3 is made of elastic material having a modulus of elasticity that is 10 times smaller than the modulus of elasticity of the material of the hollow profile 2.

In one embodiment of the transducer assembly 1, the insulating element 3 may be elastically deformable in a reversible manner and may be pressed into the holding device 4. In this way, the insulating element 3 can be secured to the hollow profile 2 in a quick and easy manner, as shown schematically in FIG. 5. In FIG. 5, the solid black arrows indicate the direction in which the respective insulating element 3 is moved for pressing it into the holding device 4. It should be understood that this way of securing is an alternative to the option shown in FIG. 6, i.e., securing of the insulating element 3 by sliding the insulating element 3 in the direction of the longitudinal axis y into the holding device 4. In the embodiment schematically shown in FIG. 5, as the insulating element 3 is pressed into the holding device 4, the retaining element 42 causes a temporary partial deformation of the insulating element 3 under the action of a pressing force whereafter a portion of the insulating element 3 of the partially deformed insulating element 3 can move past the retaining element 42 and be inserted in the holding device 4. After inserting the insulating element 3 in the holding device 4 with the corresponding portion of the insulating element 3, the temporary partial deformation of the insulating element 3 ceases to persist and the insulating element 3 accordingly returns to its original shape and, thus, is secured in the holding device 4 by being positive fit connection thereto. Insulating elements 3 may be used that are adapted for securing by means of sliding and by means of pressing so that an insulating element 3 that can be pressed into the holding device 4 can also be slid into the holding device 4.

In an embodiment of the transducer assembly 1, the hollow profile 2 comprises at least one second holding means 4 on an opposite side of the hollow profile 2 with respect to the transverse axis X, as shown in FIG. 7. Like the original holding means 4, the second holding means 4 may comprise a recess 41a between the tubular portion 15 and the force introduction element 14 and a hook-shaped retaining element 42a. In this embodiment, an insulating element 3 is secured by at least two holding means 4. This results in improved securing of the insulating element 3 in comparison to a hollow profile 2 that comprises one holding means 4 on each opposite side of the hollow profile 2 with respect to the transverse axis X.

In an embodiment of the transducer assembly 1, the insulating element 3 is made in one piece. This is advantageous for transducer assemblies 1 of up to 1000 mm in length since the number of parts to be mounted is kept low.

Figure 8:
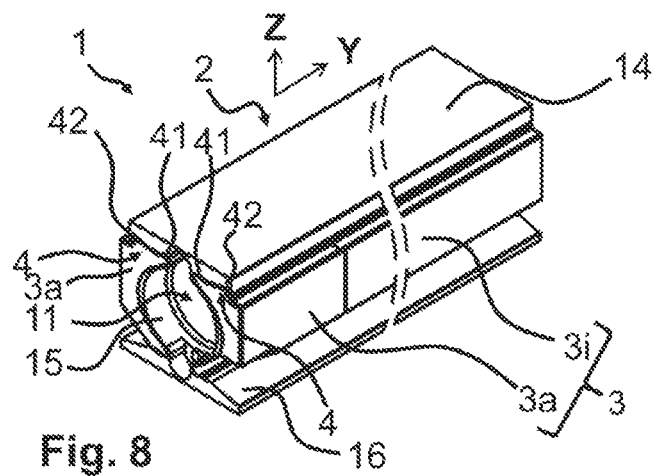
FIG. 8 shows a partial perspective view of an embodiment of the transducer assembly.

In an embodiment of the transducer assembly 1, the insulating element 3 is assembled from at least two insulating pieces $3a$ to $3i$, with i=[b, . . . , z], as shown schematically in FIG. 8. Insulating pieces $3a$ to $3i$ may have different dimensions. Insulating pieces $3a$ to $3i$ may be joined to each other by a frictional connection, a positive fit connection or by material bonding. Insulating pieces $3a$ to $3i$ may also be attached to the hollow profile 2 individually by positive fit connection side by side to each other with respect to the longitudinal axis Y without being connected to each other. This is advantageous for a transducer assembly 1 having a length of 2000 mm or more along the longitudinal axis Y since the insulating element 3 that consists of a plurality of insulating pieces $3a$ to $3i$ may be handled more easily so that mounting is easier and quicker although the number of parts is higher.

For transducer assemblies 1 having lengths in the range between 1000 mm and 2000 mm an insulating element 3 made in one piece or an insulating element 3 consisting of a plurality of insulating pieces $3a$ to $3i$ is equally advantageous.

In a preferred embodiment of the transducer assembly 1, the insulating element 3 consists of expanded polyethylene or of expanded polystyrene or of extruded polystyrene. Furthermore, the insulating element 3 may be made of expanded ethylene-propylene-diene rubber, expanded silicone or expanded polypropylene or similar materials. These materials enable the insulating element 3 to be manufactured at low cost. At the same time, the material is suitable for minimizing a force shunt through the casting compound 98 that surrounds the transducer assembly 1. In addition, the material has a low modulus of elasticity in comparison to the casting compound 98 or to metals or metal alloys. Moreover, the material of the insulating element 3 may be deformed under the action of a force, this deformation being reversible when the force is removed. This makes the material suitable for manufacturing an insulating element 3 which may be both pressed and slid into the holding means 4, as respectively shown in FIG. 5 and FIG. 6.

In an embodiment of the transducer assembly 1, the insulating element 3 is provided with a two-dimensional adhesive film (not shown in the figures) on the side facing the hollow profile with respect to the transverse axis X. When the insulating element 3 is pressed into the holding means 4, the insulating element 3 is not only secured to the hollow profile 2 by the positive fit connection but also by material bonding due to the adhesive film. This prevents the insulating element 3 that is positive fit to the holding means 4 from moving along the longitudinal axis Y, for example when the insulating element 3 hits a hard object when the transducer assembly 1 is handled for being mounted in the roadway 9.

Figure 9:
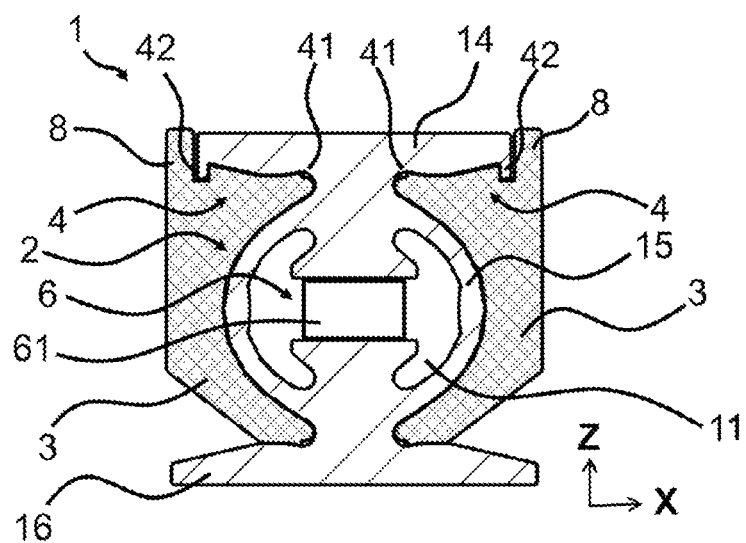
FIG. 9 shows a cross-sectional view in the X-Z plane of an embodiment of the transducer assembly.
Figure 10:
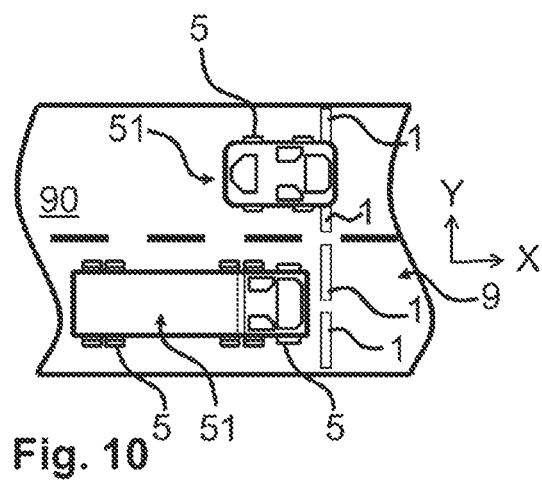
FIG. 10 shows a schematic partial view of an overhead perspective of a roadway with transducer assemblies inserted into the roadway.

In one embodiment of the transducer assembly 1, the insulating element 3 and the decoupling strip 8 are made in one piece, as shown schematically in FIG. 9. This reduces the number of components to be mounted of the transducer assembly 1 and makes mounting easier, faster and less expensive. The decoupling strip 8 is made of a flexible material, such as expanded polyethylene, expanded polystyrene, extruded polystyrene, expanded ethylene-propylene-diene rubber, expanded silicone, or expanded poly-propylene.

In one embodiment, the force sensor assembly 6 is arranged in the hollow profile 15 in an elastically preloaded manner in mechanical contact with the hollow profile 2. This advantageously establishes a well-defined mechanical contact between the hollow profile 2 and the force sensor assembly 6. If the mechanical contact between the hollow profile 2 and the force sensor assembly 6 is not well defined, for example in the case of gaps between the hollow profile 2 and the force sensor assembly 6, then a force acting on the force introduction element 14 will be insufficiently transmitted to the force sensor assembly 6 at the position of the gap. This leads to the determination of the force acting on the transducer assembly 1 being disadvantageous and inaccurate. Thus, a well-defined mechanical contact between the hollow profile 2 and the force sensor assembly 6 generated by elastically preloading the force sensor assembly 6 is advantageous and increases the accuracy of the detection of the force acting on the transducer assembly 1 as compared to a transducer assembly 1 in which the force sensor assembly 6 is not preloaded in the hollow profile 2.

In a presently preferred embodiment, the force sensor assembly 6 comprises at least two force sensors 61 spaced apart along the longitudinal axis Y. In this embodiment, the force sensor 61 is a piezoelectric force sensor 61. A piezoelectric force sensor 61 is suitable for detecting dynamic forces with detection frequencies of at least several kilohertz (kHz). The detection frequency is defined as the number of times a value of the weight force can be detected per time unit. The detection frequency of at least several kilohertz enables the detection of weight forces of vehicles that cross a transducer assembly 1 whose spatial extension is for example 25 mm at a speed of 100 km/h and more. For ensuring a good weight force detection, the detection frequency must be adapted for detecting more than 4 weight force values while the wheel of the vehicle crosses the transducer assembly. This sensitive detection frequency may be achieved by using piezoelectric force sensors 61.

The piezoelectric force sensors 61 are spaced apart from each other along the longitudinal axis Y whereby the force sensor assembly 6 is adapted for detecting a force acting on the force introduction element 14 at any point along the longitudinal axis Y of the transducer assembly 1. Advantageously, the distance between spaced-apart piezoelectric force sensors 61 is between 20 mm and 500 mm, preferably between 40 mm and 100 mm.

However, it is also possible to use a transducer assembly 1 in which the force sensor assembly 6 comprises at least one force sensor 61; which force sensor 61 is an optical fiber extending along the longitudinal axis Y. The use of an optical fiber for detecting a force is known to those skilled in the art. Electromagnetic radiation conducted by the optical fiber is altered by a force acting on the optical fiber. This alteration is a measure of the force. Optical fiber also refers to a conductor of non-visible electromagnetic radiation, for example a conductor for infrared radiation or ultraviolet radiation.

However, it is also possible to provide a capacitive force sensor 61 or a strain gauge 61 or a piezoresistive force sensor 61 for inclusion in the force sensor assembly 6. These may be configured to extend along the longitudinal axis Y or may be arranged spaced apart from each other as discrete force sensors 61. The distance between spaced-apart capacitive force sensors 61 or strain gauges 61 or piezoresistive force sensors 61 advantageously is between 20 mm and 500 mm, preferably between 40 mm and 100 mm.

Preferably, the hollow profile 2 is made of a metal or metal alloy, for example aluminum, iron, titanium, copper, steel, stainless steel, aluminum alloys, brass or similar metals or metal alloys. These show good mechanical resistance for use in the transducer device in the roadway 9. Furthermore, they have material properties suitable for arranging the force sensor assembly 6 in the hollow profile 2 in a preloaded manner. In addition, the choice of material ensures that the preloading is maintained over a prolonged time period of a plurality of years.

Preferably, the transducer device is used for determining a weight force of at least one wheel 5 of a moving vehicle 51, which wheel 5 is in direct contact with the roadway 9.

It should be understood that the features of different embodiments may be combined. However, new embodiments that include a combination of two or more features of the embodiments described above are equally suitable for achieving the object underlying the present invention.

LIST OF REFERENCE NUMERALS

1 transducer assembly
2 hollow profile
3 insulating element
3a, 3i insulating piece
4 holding means
5 wheel
6 force sensor assembly
7 rolling force
8 decoupling strip
9 roadway
11 cavity
14 force introduction element
15 tubular portion
16 anchoring element
41 recess
42 retaining element
51 vehicle
61 force sensor
90 roadway surface
98 casting compound
99 casting compound
X transverse axis
Y longitudinal axis
Z vertical axis

The invention claimed is:

1. A transducer assembly for mounting in a roadway, the transducer assembly comprising:
   a hollow profile defining an outside and extending along a longitudinal axis;
   a force sensor assembly;
   at least one insulating element arranged on the outside of the hollow profile;
   wherein the insulating element is configured to insulate the transducer assembly after mounting in the roadway from a rolling force acting on the sides thereof;
   wherein the hollow profile includes at least one holding means that establishes a positive fit connection between the insulating element and the hollow profile;
   wherein the insulating element is configured to be inserted in the holding means by sliding the insulating element along the longitudinal axis;
   wherein said hollow profile has an interior that defines a cavity and said force sensor assembly is arranged in the cavity;

wherein the force sensor assembly is configured and disposed within the cavity to detect a weight force exerted onto the hollow profile; and wherein the insulating element is secured to the hollow profile by the positive fit connection.

2. The transducer assembly according to claim 1, wherein the positive fit connection is effective in a direction perpendicular to the longitudinal axis so that the insulating element is fixed relative to the hollow profile in all directions perpendicular to the longitudinal axis.

3. The transducer assembly for mounting in a roadway according to claim 1, wherein the hollow profile defines a pair of sides that extend along the longitudinal axis and are spaced apart in a direction of a transverse axis that is perpendicular to the longitudinal axis;

wherein at least two insulating elements are secured to the hollow profile by a positive fit connection;

wherein on each side of the hollow profile with respect to the transverse direction at least one insulating element is positive fit to the hollow profile.

4. The transducer assembly according to claim 1, wherein the insulating element is made of an elastic material that has a modulus of elasticity that is 4 times lower than the modulus of elasticity of the material of the hollow profile.

5. The transducer assembly according to claim 4, wherein the insulating element is elastically deformable in a reversible manner and pressed into the holding means.

6. The transducer assembly according to claim 1, wherein the force sensor assembly is arranged elastically preloaded in the hollow profile in mechanical contact with the hollow profile.

7. The transducer assembly according to claim 1, wherein the hollow profile is made of a metal or a metal alloy; and wherein the hollow profile comprises at least two holding means arranged on both sides thereof with respect to the transverse axis.

8. The transducer assembly according to claim 1, wherein the insulating element is made of expanded polyethylene or expanded polystyrene or extruded polystyrene or expanded ethylene-propylene-diene rubber or expanded silicone or expanded polypropylene.

9. The transducer assembly according to claim 1, wherein the hollow profile defines a pair of sides that extend along the longitudinal axis and are spaced apart in a direction of a transverse axis that is perpendicular to the longitudinal axis;

wherein the force sensor assembly comprises at least two force sensors spaced-apart from each other along the longitudinal axis; and wherein each of the at least two force sensors is a piezoelectric force sensor.

10. The transducer assembly according to claim 1, wherein the insulating element includes at least two insulating pieces that have been assembled together.

11. The transducer assembly according to claim 1, wherein the insulating element is made of an elastic material that has a modulus of elasticity that is 10 times lower than the modulus of elasticity of the material of the hollow profile.

12. A transducer assembly for mounting in a roadway, the transducer assembly comprising:

a hollow profile defining an outside and extending along a longitudinal axis:

a force sensor assembly;

at least one insulating element arranged on the outside of the hollow profile;

wherein the insulating element is configured to insulate the transducer assembly after mounting in the roadway from a rolling force acting on the sides thereof;

wherein the hollow profile includes at least one holding means that establishes a positive fit connection between the insulating element and the hollow profile;

wherein the hollow profile has an interior that defines a cavity and the force sensor assembly is arranged in the cavity;

wherein the force sensor assembly is configured and disposed within the cavity to detect a weight force exerted onto the hollow profile; and wherein the insulating element is secured to the hollow profile by the positive fit connection;

wherein said hollow profile defines an anchoring element;

wherein said hollow profile comprises a plate-shaped force introduction element;

wherein said hollow profile comprises a tubular portion that is arranged between said force introduction element and said anchoring element;

wherein the tubular portion is configured to enclose the cavity;

which anchoring element and which tubular portion and which force introduction element are made in one piece;

which tubular portion is integrally connected to the force introduction element and to the anchoring element;

wherein the holding means consists of a recess between the tubular portion and force introduction element and a hook-shaped retaining element, wherein a positive fit connection secures the insulating element between said recess and the retaining element.

13. The transducer assembly according to claim 12, further comprising:

at least one decoupling strip arranged next to the force introduction element with respect to the transverse axis;

wherein the decoupling strip extends over the length of the insulating element along the longitudinal axis and extends in the vertical direction from the insulating element, laterally contacting the force introduction element, up to the roadway surface;

wherein the insulating element and the decoupling strip are made in one piece.

* * * * *